Patented Nov. 13, 1945

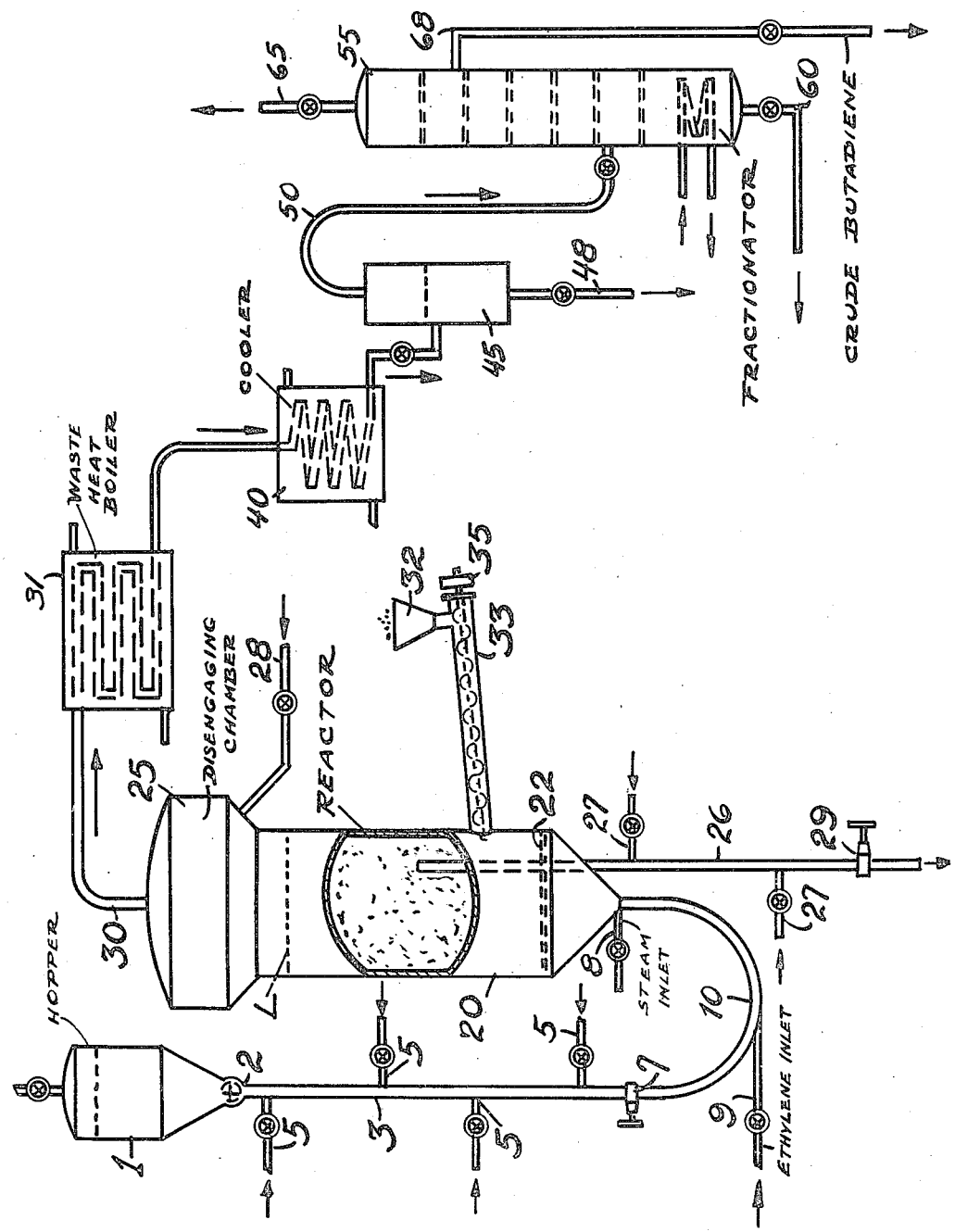

2,388,916

UNITED STATES PATENT OFFICE 2,388,916

PROCESS FOR PREPARING DIOLEFINS FROM ETHYLENE, STEAM, AND CALCIUM CARBIDE

Clinton H. Holder, Cranford, N. J., assignor to Standard Oil Development Company, a corporation of Delaware Application June 18, 1943, Serial No. 491,313

10 Claims. (Cl. 260—680)

The present invention relates to improvements in the synthesis of butadiene, and in particular it relates to an improved process for synthesizing butadiene from acetylene and ethylene.

The production of synthetic rubber and rubber substitutes has become an important problem. Numerous proposals have been made for preparing rubber substitutes and rubber-like materials. Several of these processes involve the use of a diolefin known as butadiene. For example, a rubber substitute suitable for manufacturing a rubber-like material suitable for making automobile tires may be prepared by condensing together or copolymerizing, butadiene and styrene.

There are a number of methods for making butadiene, which involve a variety of starting materials. One of the most practical general sources of butadiene is the petroleum field, even though butadiene is not produced in substantial quantities in any common or conventional petroleum refining operation. However, relatively large quantities of ethylene are produced in cracking, reforming, dehydrogenation and other commonly used processes in modern petroleum oil refinery practice.

My present invention takes advantage of the fact that reasonably large quantities of ethylene are available in the ordinary refinery as a result of normal operations, and at the same time, further quantities of ethylene could be specially produced. As to the acetylene which I condense with the ethylene to form butadiene, I propose to form that material by treating powdered calcium carbide in the form of a "fluidized" mass, with steam and to react the nascent acetylene thereby released with the ethylene in situ and in the presence of a catalyst, calcium oxide, to form substantial quantities of butadiene, all of which will more fully and at large appear, hereinafter.

In order to facilitate understanding of my invention, I have shown in the accompanying drawing, diagrammatically, a flow plan indicating the important steps of my process.

Referring in detail to the drawing, I provide a source of calcium carbide ground to a particle size of from 200-400 mesh, with a size of around 300 mesh predominating in the mixture, in an elevated closed hopper 1. However, in order to conserve grinding costs much coarser particles may be used for instance up to ½ inch diameter, although ⅛ to 1/16 inch is a preferred particle size range. The closed hopper 1 is in communication with an elongated standpipe 3 through a star feeder 2 and terminates in a bend 10 projecting into a reactor 20, in which is disposed a distributor plate 22, of open mesh construction, such as a grid or screen. Ethylene from line 9 is injected into the lower bend 10 of the standpipe 3 where it mixes with the calcium carbide which descends from the hopper 1 through standpipe 3 and forms a suspension or mixture which is swept into the reactor 20 through the foraminous member 22, previously mentioned. Meanwhile steam from some source is also discharged into the reactor through a pipe 8.

Referring again to the standpipe 3, in order to facilitate the flowability or to "fluidize," the calcium carbide therein, it is found desirable to inject into the standpipe through taps 5, small quantities of a gasiform material, which in this case may be ethylene or an inert gas such as flue gas. The ascending steam, ethylene and other gas or vapors in reactor 20 is controlled as to superficial linear velocity, within the limits of 1-6 ft. per second, preferably 1½ to 3 ft. per second so as to form with the calcium carbide the fluidized mass of solids previously referred to, which mass will have an upper dense phase level at L. This "fluidized" mass is in the form of a turbulent, ebullient mixture of vapors and solids and is referred to as "fluidized" because of its particle mobility and its resemblance to a boiling liquid. The vapors after passing through reactor 20, thence flow into an expanded disengaging chamber 25 where the linear velocity of the gases is reduced to say ½ ft./second, due to the greater diameter of the chamber 25, at which velocity the gases and/or vapors will not support fully the solids and the latter gravitate into the main body of reactor 20 so that the gas is eventually substantially freed of entrained solids. Thus, where the density of the material in the reactor 20 is from 15-25 lbs./cu. ft., the density of the gasiform material in line 30 may be of the order of 0.025 to 0.050 lb./cu. ft. I provide a bottom draw-off pipe 26 projecting, as shown, into the reactor 20. In order to facilitate withdrawal of this product which will be, largely, calcium oxide or calcium hydroxide, I bleed into the draw-off pipe 26 through a plurality of taps 27 a gasiform material which may be steam, flue gas, $CO_2$, ethylene, and the like. The draw-off pipe 26 has a flow control valve 29, and also the standpipe 3 is provided with a flow control valve 7 so that by manipulation of valves 7 and 29 and fixing the gas velocity in 20, I may continuously feed calcium carbide to the reactor to maintain therein sufficient solids to provide the fluidized mass with the density indicated and continuously withdraw lime or calcium hydroxide through draw-off pipe 26.

The product is withdrawn through line 30, and contains, in addition to butadiene, steam, unreacted acetylene, ethylene, and products such as benzene and various other hydrocarbons. In order to recover the butadiene, I propose to cool the materials sufficiently to condense the steam and thereafter to fractionate the remaining hydrocarbons to recover the butadiene. Of course, acetylene, particularly, when freshly made, is a material somewhat dangerous to handle since it is liable to explode, but when diluted or quenched with hydrocarbons the sensitivity in this regard is reduced. Another good way of decreasing the sensitivity of acetylene to explosion would be to inject a small quantity of ethylene through 28 into chamber 25, since ethylene is especially effective in this regard. The products in line 30 are then passed through a waste heat boiler 31 to cool the same and thence passed through a second cooler 40 where they are cooled below the condensation point of steam and thence discharged into a water separator 45 from which water may be withdrawn through line 46, while the gaseous hydrocarbons are taken off overhead through line 50 and thence passed into a fractionator 55. The benzene and other normally liquid hydrocarbons may be withdrawn from the fractionator through line 60, while the C₃ and lighter hydrocarbons may be withdrawn overhead through line 65. The C₄ fraction containing the butadiene may be withdrawn as a side stream through line 68 and subjected to redistillation and/or solvent treating, if necessary, to recover commercially pure butadiene. The separation of butadiene from other C₄ hydrocarbons, such as isobutane, butane, normal butene, and isobutylenes is well known to those familiar with this art and need not be described in detail. Suffice it to say that some of these hydrocarbons may be separated by close fractional distillation, while others such as butene-1 may not be so separated, and one good practice is to subject them to a vapor-liquid solvent treatment wherein the butadiene passes into the extract phase while the butene-1 or butene-2 is undissolved by the solvent. A satisfactory selective solvent for separating butadiene from butene-1 and butene-2 is copper acetate in ammonia.

Having generally described a preferred method of operating my process, I shall now disclose the preferred operating conditions in reactor 20. It has been found that acetylene reacts with ethylene at about 850° F. to give 30% yields and this may be increased to 85% on feed by recycling of the unconverted products. As regards the pressure prevailing in reactor 20, the same should be of the order of atmospheric pressure to 100 lbs./sq. in. As to the proportion of reactants the steam should be somewhat in molal excess (5 to 10%) of the stoichiometric proportion for the carbide-steam reaction. Ethylene should be in molal slight excess (say 10% of the theoretical) of the available acetylene, that is to say there should be about 1.1 mols of ethylene for each mol of acetylene in reactor 20. Feed rates of about 1.0 weight of feed gases per weight of carbide per hour have been found satisfactory although the range 0.1 to 5.0 weights of feed gas per weight of calcium carbide per hour may be used. Steam may be employed to vary the feed rate. Contact times (i. e. residence time of reactants in the reactor) should be of the order of 5 seconds to 5 minutes.

It is pointed out that instead of employing a standpipe to feed the calcium carbide into the reactor, I may employ other feeding means such as a screw conveyor. Thus, I may discharge say powdered calcium carbide into feed hopper 32 and cause the powdered material to be fed to the reactor by the operation of screw feeder 33 motivated by a suitable driving means (not shown) operating on pulley 35 or other driver means of the said conveyor. The steam and ethylene would be fed into the bottom of the reactor as above, in this modification.

As an illustration of the operation of the above described process under a preferred set of conditions, and using the apparatus illustrated in the drawing, a mixture of steam and ethylene is passed through the reaction zone with an amount of 200 mesh calcium carbide such that the weight ratio of the ethylene-steam mixture to the calcium carbide is about 0.8; the linear gas velocity in the reactor is about 1.5 feet per second; the pressure in the reactor is about 25 lbs./sq. in. gauge, and the temperature about 850° F.; and the dimensions of the reactor are chosen so that the time of residence of the gas within the reactor is about 6.6 seconds. Under these conditions the butadiene yield will be about 25%, based on the weight of the ethylene used and the available acetylene, in a once through operation. This yield can be improved by operating at a somewhat higher pressure, also by recycling unconverted products.

Reviewing the foregoing briefly, my invention relates to a method of producing butadiene by copolymerizing and/or condensing together acetylene and ethylene. The acetylene is produced by treating powdered calcium carbide with steam at temperatures of from about 700° to 1100° F. which are most favorable for the reaction between ethylene and acetylene to form butadiene. The ethylene is prepared in known manner, for example, by steam cracking at high temperatures, or from any of the normal petroleum refinery operations. It is pointed out that in addition to obtaining butadiene, my process also results in the production of other diolefins such as pentadiene or isoprene. Also, side reactions, as aromatics and alkylated derivatives thereof, are formed. Of course, in my process CaO or the equivalent of burnt lime will also be produced at the high temperatures involved.

My process affords several very desirable features. By generating acetylene in the hot zone nascent acetylene which appears to be more reactive than ordinary acetylene is produced in contact with the desired reactant ethylene. Thus, the necessity of heating the acetylene separately with the attendant possibility of causing polymerization is avoided. Further advantage is obtained by virtue of the fact that the continuously formed fresh supply of calcium oxide is a catalyst for the copolymerization of acetylene and ethylene to form butadiene. The "fluid" technique permits flexibility of operation so that the "exothermic" heat of the carbide-steam reaction may be utilized to advantage. Also, because of the exothermic nature of the reaction between steam and calcium carbide it is possible to utilize the heat of reaction to bring the reactants to the desired temperature and thereby achieve heat economy. The reaction involved together with the heat released is set forth below:

$$CaC_2 + H_2O \rightarrow CaO + C_2H_2$$

$$\Delta H = +14,396 \text{ cals./mol. of } CaC_2$$

The fluidized condition of the calcium carbide affords a convenient means of uniformly distributing the heat of reaction. Further control on the temperatures inside reactor 20 is possible by preheating the steam and/or the ethylene to reach higher temperatures or to achieve the opposite purpose, an excess of steam may be used in the capacity of a cooling gas in order to lower the operating temperature. The introduction of the reactants in the manner specified above permits the formation of nascent acetylene at reaction temperature and in the presence of the second reactant, ethylene. In addition the calcium oxide resulting from the steam-calcium carbide reaction is a catalyst for the copolymerization of acetylene and ethylene which it is desired to promote.

Numerous modifications of my invention falling within the scope thereof may be made by those familiar with this art without departing from the spirit of my invention.

What I claim is:

1. A continuous method of forming butadiene which comprises feeding subdivided calcium carbide into a reaction zone, simultaneously feeding ethylene and steam to said reaction zone, causing the calcium carbide to form a fluidized mass in the reaction zone by controlling the linear velocity of gasiform material within the reaction zone within the limits of ½ to 6 feet per second, permitting the reactants to remain in contact with each other at elevated temperatures for a sufficient period of time to effect the desired reaction and recovering from the reaction zone, vapors containing butadiene.

2. The method specified in claim 1 in which the temperature within the reaction zone is from 700° to 1100° F.

3. The method of continuously synthesizing butadiene in a reaction zone which comprises continuously forming acetylene in said zone by reacting calcium carbide with steam at temperatures of from 700 to 1000° F. and continuously feeding ethylene into said zone where it contacts nascent acetylene.

4. The method of claim 3 in which the calcium carbide is maintained in a fluidized mass by controlling the linear velocity of gasiform material in the reaction zone between ½ to 6 feet per second.

5. The method of claim 3 in which the temperature in the reaction zone is about 850° F.

6. The method of claim 3 in which molal concentration of ethylene exceeds that of the acetylene in the reaction zone.

7. The method of claim 3 in which direct steam is employed to temper the exothermic reaction taking place between acetylene and ethylene.

8. The method of claim 3 in which crude butadiene vapors containing unreacted acetylene are withdrawn from the reaction zone and immediately quenched.

9. A continuous process of synthesizing butadiene which comprises continuously feeding powdered calcium carbide to an elongated vertical confined reaction zone, simultaneously feeding steam and ethylene to the reaction zone to inlets at near the bottom thereof, permitting the ethylene and steam to flow upwardly within said reaction zone at linear velocities of from about ½ to 6 feet per second whereby the powdered calcium carbide is maintained in a fluidized state, maintaining the temperature within the reaction zone between 700° and 1100° F. by control of the entering steam temperature and the amount thereof, permitting the steam and calcium carbide to contact each other for a sufficient period of time to form acetylene, which acetylene in nascent state reacts with the ethylene to form butadiene under the temperature conditions specified and withdrawing vapors containing butadiene from the reaction zone.

10. The method of claim 9 in which the temperature within the reaction zone is maintained at about 850° F.

CLINTON H. HOLDER.